United States Patent [19]

Brown et al.

[11] Patent Number: 5,440,237

[45] Date of Patent: Aug. 8, 1995

[54] ELECTRONIC FORCE SENSING WITH SENSOR NORMALIZATION

[75] Inventors: Daniel R. Brown, Beaver Creek; Philip D. Biehl, Tigard, both of Oreg.

[73] Assignee: InControl Solutions, Inc., Clackamas, Oreg.

[21] Appl. No.: 69,717

[22] Filed: Jun. 1, 1993

[51] Int. Cl.⁶ .................. G04F 10/00; G01L 7/04
[52] U.S. Cl. ............................ 324/601; 324/130; 364/571.01
[58] Field of Search ............... 324/115, 73.1, 132, 324/74, 130, 601; 345/159, 161; 364/571.01-571.08

[56] References Cited

U.S. PATENT DOCUMENTS

| | | | |
|---|---|---|---|
| 4,374,381 | 2/1983 | Ng et al. | 340/711 |
| 4,399,515 | 8/1983 | Gross | 364/571.04 |
| 4,446,715 | 8/1984 | Bailey | 364/571.02 |
| 4,716,536 | 12/1987 | Blanchard | 364/571.04 |
| 4,725,950 | 2/1988 | Woods | 364/571.06 |
| 5,012,231 | 4/1991 | Felsenstein | 340/709 |
| 5,095,453 | 3/1992 | Pierson et al. | 364/571.05 |
| 5,135,002 | 4/1992 | Kirchner et al. | 364/571.03 |
| 5,247,467 | 9/1993 | Nguyen et al. | 364/571.02 |
| 5,269,311 | 12/1993 | Kirchner et al. | 364/571.02 |
| 5,345,400 | 9/1994 | Bissell et al. | 364/571.01 |
| 5,347,476 | 9/1994 | McBean, Sr. | 364/571.04 |

FOREIGN PATENT DOCUMENTS

| | | |
|---|---|---|
| 0302385A2 | 7/1988 | European Pat. Off. . |
| 0535907A2 | 4/1993 | European Pat. Off. . |
| 352370A1 | 6/1985 | Germany . |
| 3913648C1 | 4/1989 | Germany . |
| PCT/US88/-04545 | 12/1988 | WIPO . |
| PCT/GB88/-00822 | 4/1989 | WIPO . |

OTHER PUBLICATIONS

Lindahl, "A Digital compensation Technique for Pressure Transducers", 1982, pp. 343-344.

*Primary Examiner*—Ernest F. Karlsen
*Attorney, Agent, or Firm*—Marger, Johnson, McCollom & Stolowitz

[57] ABSTRACT

Methods and apparatus are disclosed for normalizing electronic sensor data to correct for variations in individual sensor transfer characteristics which are not known in advance. A general characteristic transfer function for a sensor type of interest is determined empirically. A baseline response reading is acquired from an individual sensor, and that baseline response applied to the general transfer function to determine a specific transfer function for the individual sensor. The specific transfer function is used to calculate normalized data. One application of the invention is in computer cursor control pointing devices such as a joystick. Because the invention compensates for wide variations in sensor characteristics, inexpensive sensors such as force-sensitive resistors may be used in a joystick without sacrificing pointing accuracy and ergonomic efficiency.

13 Claims, 8 Drawing Sheets

|  | Sensor1 | | Sensor2 | | Sensor3 | | Sensor4 | |
|---|---|---|---|---|---|---|---|---|
|  | resistance | counts | resistance | counts | resistance | counts | resistance | counts |
| Baseline Value | 10.0 |  | 6.0 |  | 18.0 |  | 26.0 |  |
| Active Res2 | 12.4 | 1.4 | 6.9 | -1.7 | 23.7 | 1.0 | 35.3 | -0.0 |
| Active Res3 | 10.9 | 21.3 | 6.4 | 16.7 | 20.2 | 20.6 | 29.1 | 22.2 |
| Active Res4 | 10.0 | 38.0 | 6.1 | 31.9 | 18.0 | 38.0 | 26.0 | 38.0 |
| Active Res5 | 9.4 | 52.2 | 5.9 | 44.7 | 16.7 | 51.1 | 23.7 | 52.9 |
| Active Res6 | 8.7 | 73.4 | 5.6 | 70.0 | 15.1 | 71.4 | 21.2 | 73.7 |
| Active Res7 | 8.4 | 84.5 | 5.5 | 80.7 | 14.3 | 84.0 | 19.9 | 87.1 |
| Active Res8 | 8.0 | 102.0 | 5.4 | 92.9 | 13.4 | 100.6 | 18.1 | 109.7 |
| deltaR/CNT | 41.5 |  | 14.2 |  | 97.2 |  | 162.3 |  |

Figure 7

ELECTRONIC FORCE SENSING WITH SENSOR NORMALIZATION

BACKGROUND OF THE INVENTION

The present invention relates to the field of electronic sensing, i.e. electronic methods and apparatus for detecting force, displacement or other physical quantities. More specifically, the present invention relates to sensing methods and apparatus that automatically normalize acquired sensor data so as to compensate for variations in sensitivity from one sensor to another.

Force sensors, for example, can be used to provide feedback information in real-time machinery or process control applications. Another use of force sensing is in human interface applications such as isometric joysticks. Isometric joysticks are used for manual input of directional (and optionally other) information, for example, for cursor control on a computer display screen.

Isometric joysticks for cursor control can be arranged as a stand-alone or dedicated joystick positioned, for example, between the keys of a computer keyboard. Such arrangements are shown in T. Bentley and G. Meyer, *Design and Evaluation of a Text Editing Console*, SID 76 Digest, p. 67 (1976) and in PCT publication No. WO 92/09996. Alternatively, a joystick for cursor control can be implemented as part of a multi-purpose keyswitch, i.e. a keyswitch for both typing and pointing operations, as shown in U.S. Pat. No. 4,680,577 to Straayer et al.

Straayer et al. suggested use of pressure sensors or other force sensitive devices in a pointing device. One type of force sensor useful in pointing devices is a force-sensitive resistor ("FSR"). In a joystick that employs FSRs, forces applied by a user are detected as changes in resistance in the FSRs. Generally, three or four FSRs are symmetrically arranged around a shaft or pointing stick to resolve a direction of applied force in the X-Y plane. Downward force (Z direction) can also be detected in a suitable apparatus.

A commonly-assigned, co-pending application Ser. No. 07/672,641, filed Mar. 18, 1991 and entitled "Data Acquisition in a Multi-Function Keyboard System Which Corrects for Preloading of Force Sensors," discloses, inter alia, methods and apparatus for acquiring pointing data in a multi-function keyboard system. In one example of such a system, the keyboard includes a multi-purpose pointing key having a plurality of force sensors coupled to the key to acquire pointing information. Means are provided for selecting one at a time of a typing mode of operation for acquiring typing data, and a pointing mode of operation for acquiring pointing data. In the latter mode, the multi-purpose pointing key essentially acts as an isometric joystick for cursor control.

According to the prior invention, the force sensors are "preloaded" so that each of them exhibits an analog bias value, referred to herein as a "baseline response," when no external force is applied to the sensors by a user. The prior application teaches methods of determining the corresponding bias value for each of the force sensors, and deducting the force sensor bias values from the corresponding force sensor pointing values (readings while external force applied by a user) to determine net force values, thereby correcting for preloading of the force sensors.

However the force sensors might be arranged for a particular application, absolute amounts of force applied to a force sensor are difficult to measure due to variations in response characteristics or transfer curves from one force sensor to another. This is especially a problem in using force sensitive resistors (FSRs), for example, as the force to resistance characteristics of a given FSR model can vary as much as 60 or 70 percent from one sensor to another. Moreover, even if the absolute forces were unimportant, variations from one FSR to another within a single sensor assembly causes responses or gain that are direction dependent.

Since a direction indicated by a joystick user is determined essentially by summing forces applied to the individual sensors in the joystick assembly, each sensor having a corresponding direction, variations in response among the individual sensors leads to errors in resolving the direction and speed intended by the user—disconcerting problems to say the least. While the invention disclosed in the prior case discussed above is effective for correcting pointing data to remove the offset resulting from preloading, it does not teach how to compensate for the wide variation in sensitivities from one force sensor to another. As discussed above, these variations have an adverse effect on a pointing system.

It is possible to empirically characterize each and every force sensor to be used in a particular application. Then, suitable hardware and/or software could be arranged to normalize the individual responses from each such sensor in use. Such an approach would be neither practical nor economical and therefore is not commercially useful. Effective use of low-cost force sensors thus requires a simple and efficient way to compensate for these variations. The challenge, therefore, lies in collecting useful force data from a plurality of sensors, e.g. in a joystick, where each sensor has an individual response characteristic that is not well defined a priori, and the sensors exhibit a wide range of variability in response characteristics among them.

SUMMARY OF THE INVENTION

This invention relates to methods of making low cost, low tolerance sensors usable in applications where higher costs, higher tolerance sensors would otherwise be required. The present invention overcomes wide variations in individual sensor transfer characteristics to make such sensors more useful in applications where a standardized response is required or where the signals from multiple sensors need to be combined.

In the present invention, a sensor usage pattern including times of use (external stimulus applied) and times of disuse (no external stimulus applied) is established. A known baseline stimulus is applied (perhaps continually) and the resulting sensor output is measured during times of disuse. This baseline output, in combination with knowledge of the forms of variance expected in the particular type of sensor, is used to approximately determine the overall transfer characteristic of the particular sensor during times of actual use. The overall transfer characteristic can then be used to correct or normalize the sensor response in time of actual use. This allows a wide range of sensor variations to be normalized, including sensitivity differences, nonlinearities, drift with time or temperature, and offsets.

This correction can be performed while the sensor is in actual use, as long as the actual use includes sufficient idle periods. Idle periods can be any time when it is known that an external stimulus is not applied to the sensor.

It is an object of the present invention to enable low cost, high variability sensors to be used in applications where higher levels of predictability and uniformity are required.

It is an object of the present invention to overcome variations between sensors in order to make the sensors useful in applications where a standardized output response is required or where the signals from multiple sensors need to be combined.

Another object of the invention is to provide a useful pointing system, which exhibits smooth, even response independent of direction or amount of applied force.

Another object of the present invention is a low cost A/D conversion circuit for resistive sensors which exhibits a wide resistance range and high resolution.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 7 is a spreadsheet illustrating force count calculations according to the invention.

DETAILED DESCRIPTION OF THE PREFERRED EMBODIMENT

One use of electronic force sensing is in a dedicated pointing device such as an isometric joystick. Another application is in a pointing device arranged as part of a multi-purpose keyswitch, such as for a computer keyboard or other control panel in which a binary keyswitch combined with an analog pointing device is desired. Such a pointing device is similar in operation to a joystick. The main distinction is that a conventional joystick handle rides on a central pivot, whereas in a multi-purpose keyswitch the force sensor actuator rests solely on the force sensors themselves. The latter arrangement has an advantage in measuring vertical forces, but the data acquisition and normalization concepts of the present invention are equally applicable to sensors in virtually any application—joysticks, multi-purpose keyswitches, other human interface devices; as well as data acquisition tasks other than human interface. It is especially useful where data is acquired from multiple sensors which do not necessarily have the same response characteristics.

Multi-purpose Keyswitch Example of Force Sensing Application

Figure 1:
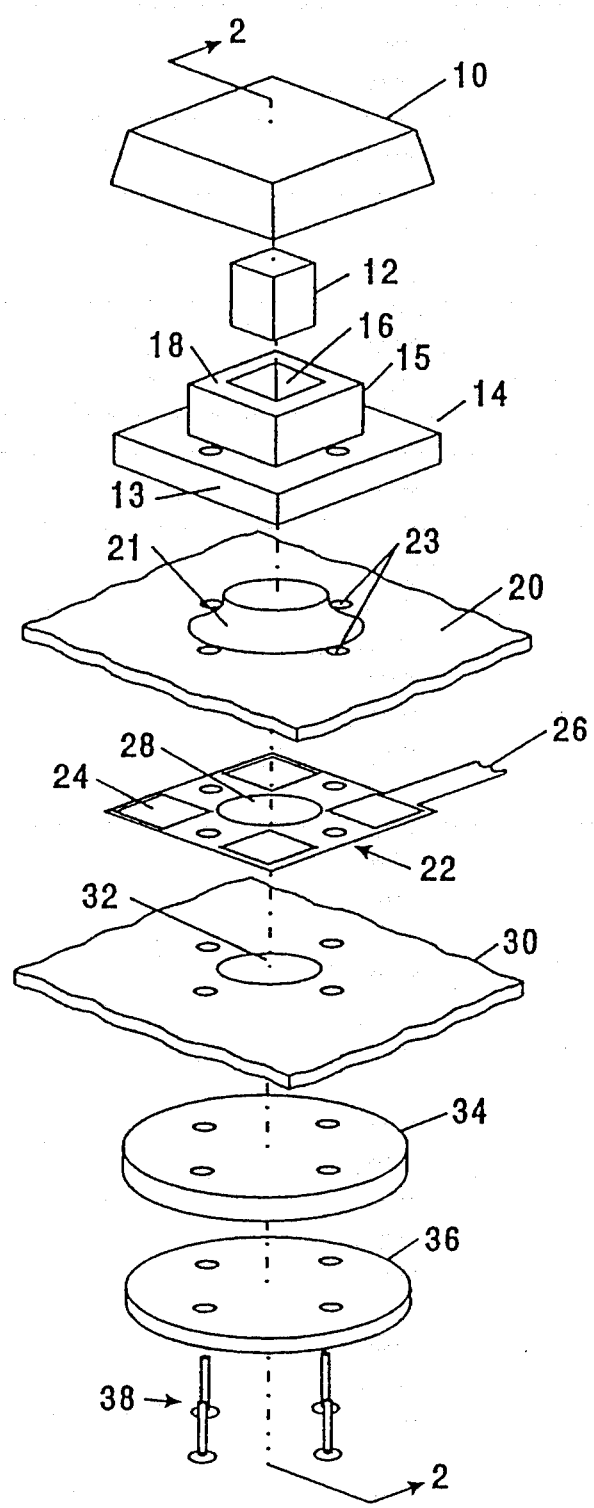
FIG. 1 is an exploded view of a multi-purpose keyswitch having a force sensor array arranged to form a pointing device.
Figure 2:
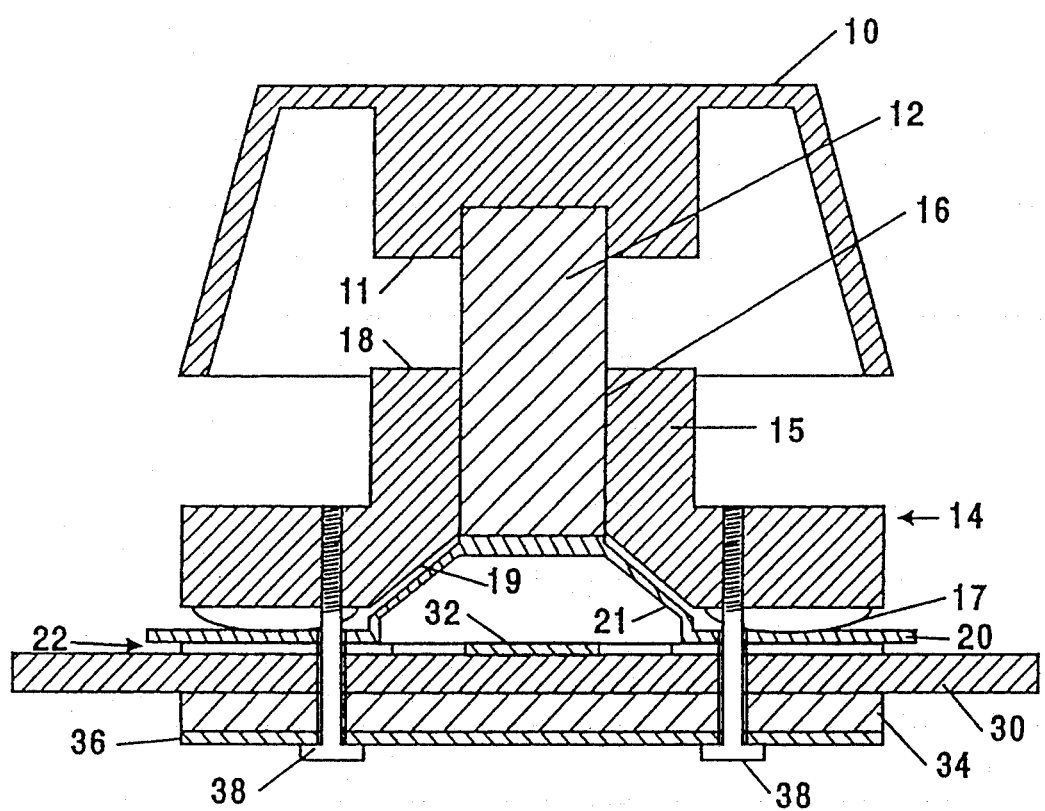
FIG. 2 is a cross-sectional view of the multi-purpose keyswitch of FIG. 1.
Figure 3:
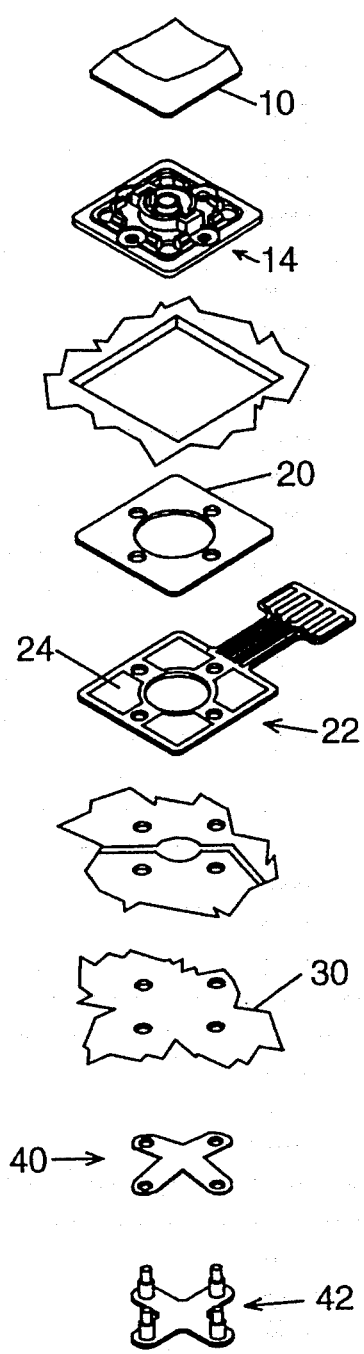
FIG. 3 is an exploded view of an alternative multi-purpose keyswitch arrangement that employs an X-spring for preloading the force sensors to baseline responses.
Figure 4:
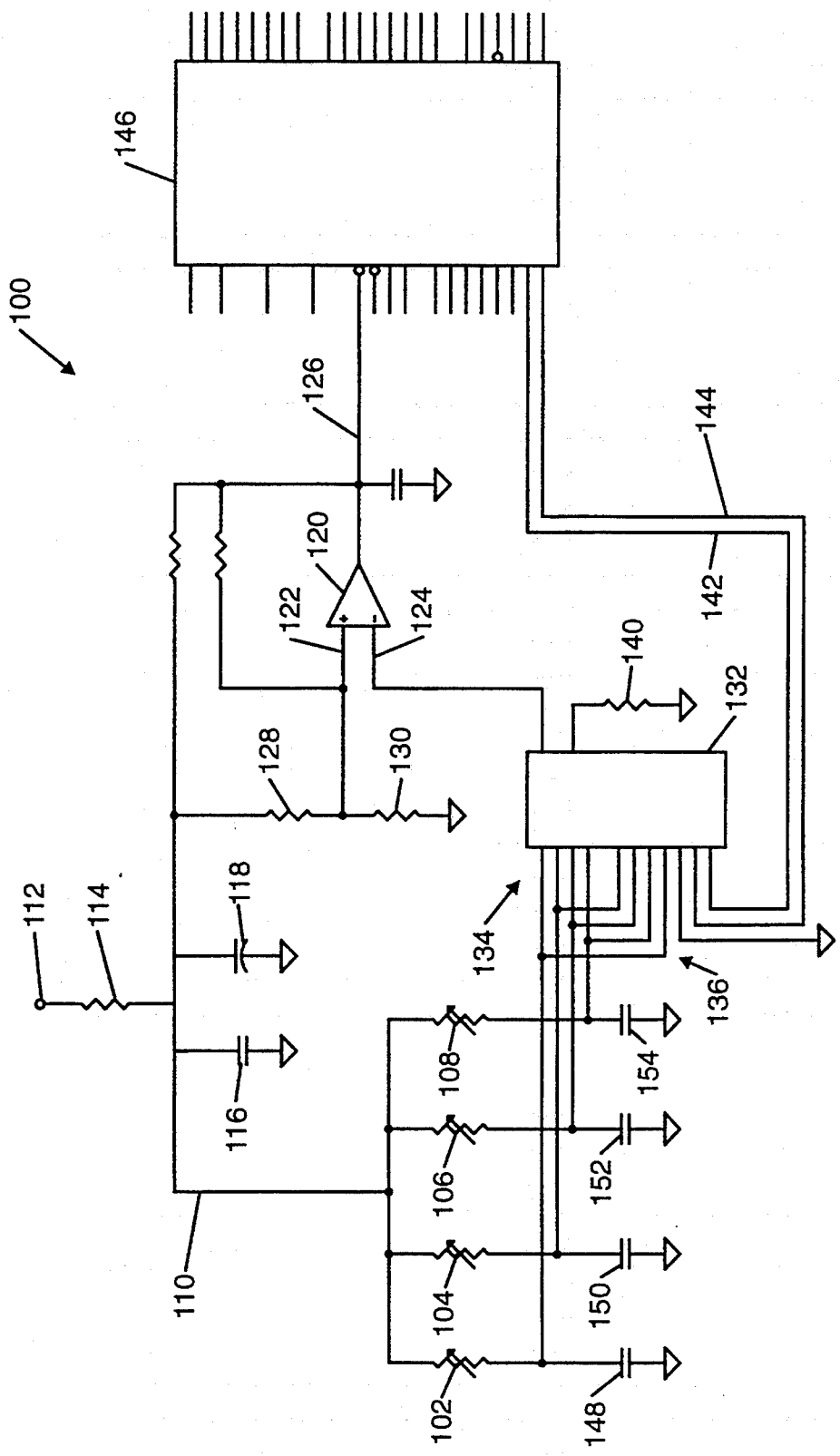
FIG. 4 is a schematic diagram of electronic circuitry for acquiring pointing data from an array of force sensors arranged to form an isometric joystick.

The preferred embodiment is a cursor control system that includes a multi-purpose keyswitch having an integrated pointing device. The pointing device includes an array of force sensors, as illustrated in FIGS. 1–3. Referring now to FIG. 1, an exploded perspective view is shown of an elastomeric keyswitch and integrated pointing assembly. A conventional elastomeric type keyboard includes a base plate 30, such being also referred to herein as a reference plate, which is generally planar. The base plate is formed of a rigid material, such as a plastic or metal, or it may be a printed circuit board. For many applications, the base plate 30 is a printed circuit board and it includes a plurality of switch contacts 32, like contacts 32, formed on the printed circuit board so that switch closure is effected by downward pressure on the switch contacts. This type of keyswitch is commonly used in a computer keyboard, in which an array of such switch contacts are formed on the base plate in a predetermined pattern corresponding to the pattern of the typing keys.

A conventional elastomeric keyboard also includes a rubber dome sheet 20. The rubber dome sheet includes an array of dome springs, like dome spring 21, which provide a spring action that biases the keyswitch to the standby open position. The rubber dome sheet 20 is registered over the base plate 30 so that each dome spring 21 is aligned over a respective one of the switch contacts 32. In some designs, the switch contacts 32 on the base plate comprise an interleaved set of conductive fingers. In that case, the underside of the dome spring 21 includes a conductive pad which, when pressed against the interleaved fingers, completes an electrical path between the fingers thereby closing the switch.

A plunger guide 14 rests on top of the rubber dome sheet 20. The plunger guide includes a central aperture 16, further discussed below. Plunger guide 14 is positioned with the aperture 16 aligned over the dome spring 21 and switch contacts 32. The plunger guide 14 also includes a tower portion 15 extending about the periphery of aperture 16. The tower portion 15 includes an upper surface 18, hereafter referred to as the actuator indexing surface. A conventional key cap 10 is coupled to a plunger 12. In some cases, the key cap and plunger are molded of a single part, and in other cases they may be formed of separate parts and engage one another. The aperture 16 is sized to fittingly engage the plunger 12 while allowing vertical sliding motion of the plunger responsive to a vertical force applied to the key cap by an operator.

A force-sensing resistor array 22 is positioned between the base plate 30 and rubber dome sheet 20. The force-sensing resistor array 22 includes a central aperture 28, sized to clear the plunger 12 and switch contacts 32. The array 22 is positioned so that the aperture 28 is registered with the plunger guide aperture 16, dome spring 21 and switch contacts 32. In a typing mode of using the apparatus, a generally downward pressure is applied to the key cap 10 by an operator. The key cap and plunger 12 move downward together, with the plunger sliding through the plunger guide aperture 16. The bottom end of the plunger contacts dome spring 21 and compresses the dome sheet so that the underside of the dome spring 21 contacts the switch contacts 32 on the base plate. Vertical travel of the key cap and plunger is limited to a position in which the key cap indexing surface 11 contacts the actuator indexing surface 18.

A pre-load pad 34 is positioned in parallel contact with the underside of base plate 30. A rigid back-up plate 36 is positioned in parallel contact with the underside of pre-load pad 34. The back-up plate 36, pre-load pad 34, base plate 30, force-sensing resistor array 22, and rubber dome sheet 20, all have a plurality of mounting holes, preferably arranged symmetrically about the neutral axis. The neutral axis, as used herein, refers to a vertical axis through the center of apertures 16, 28, dome spring 21, etc. in FIGS. I and 2 and to a corresponding central axis in each of the other embodiments.

The plunger guide/actuator 14 includes corresponding mounting holes, at least extending into the underside of the plunger guides/actuator, for receiving fastening means such as fasteners or screws 38. The screws 38 extend through the back-up plate, pre-load pad, base plate, force-sensing resistor array, rubber dome and rubber dome sheet and are threadably secured in the plunger guide/actuator for maintaining the foregoing elements in the positions described. As can be seen in FIG. 2, the bores in plates 30, 36; pad 34; array 22; and sheet 20 through which screws 38 extend are sized to leave an annular space as shown between the shaft of each screw 38 and the bores through which it is received. With the end of each screw threadably secured in guide/actuator 14, the guide/actuator may thus be rocked or tilted about the neutral axis in a manner and for a purpose which is described in more detail hereinafter. The fasteners 38 could be integrally formed with the back-up plate 36 or guide/actuator 14.

Operation of the elastomer key switch and integrated pointing assembly of FIG. 1 is best understood with reference to a cross-sectional view of the same assembly shown in FIG. 2. FIG. 2 shows the assembly of FIG. 1 in the standby state, i.e., when no external force is applied to the key cap 10. This cross-sectional view illustrates a flat configuration of the indexing surfaces 11, 18.

The actuator 14 includes four actuator surfaces 17, protruding from the underside of actuator 14 and positioned so that each of the actuator surfaces 17 contacts a respective one of the force-sensing resistor elements 24 in the array 22. Preferably, each of actuator surfaces 17 are substantially in the shape of a spherical segment. The rubber dome sheet 20 extends between the actuator surfaces 17 and the corresponding force-sensing elements 24. This is advantageous in that the rubber dome sheet smoothly disperses or distributes forces applied through the actuator surfaces 17 to the force-sensing element 24. The base plate 30 provides a relatively rigid support to the underside of the force-sensing array 22 so that forces applied through the actuator surfaces 17 are efficiently coupled to the force-sensing array. The actuator 14 includes a hollowed out portion on the underside, defined by a surface 19, so that the actuator 14 does not contact the dome spring 21. The actuator therefore does not interfere with the usual typing operation.

The height of the tower portion 15 of the actuator is sized to cooperate with the key cap and plunger to limit vertical displacement of the keycap and plunger to a position sufficient to actuate switch contacts 32, but no further. Once the indexing surfaces 11, 18 are contacting one another, substantially all forces applied to the key cap by an operator, vertical as well as lateral, are transmitted through the plunger and actuator to the force sensor array.

As noted with regard to FIG. 1, the actuator 14 is coupled to the back-up plate 36 by suitable rigid fasteners 38. The pre-load pad 34, extending between the back-up plate 36 and the base plate 30 is formed of a compressible material such as a closed cell foam. Plate 30 comprises a polyurethane foam with a low compression set. During manufacture, the fastening means are applied so as to partially compress the pre-load pad 34. This arrangement holds the entire assembly together without play and, more particularly, applies a pre-load force to each of the force-sensing elements 24.

Applying a pre-load force to the force-sensing resistor elements 24 is important for the following reasons. First, force-sensing resistor elements generally exhibit essentially infinite resistance when no force is applied to the element. When even small initial force is applied, on the order of a hundred grams, the FSR elements almost instantly drop to an initial resistance on the order of a hundred thousand ohms. This drastic change, or step response, is disconcerting to an operator and undesirable for most applications. The application of a pre-load force to the FSR device eliminates this initial step response problem.

The preload force also drives the FSRs to an operating point somewhere in the middle of their useful range. The response (a resistance) under that preloaded condition we call a "baseline response". We have discovered that the baseline response gives an indirect indication of each FSR's specific transfer characteristics, further described below, which can be used for normalizing the responses of the individual sensors.

It may be observed that the key cap 10 is entirely supported by the structures shown in FIG. 2. In a conventional keyboard, the key cap and plunger are supported by a plunger guide having a central aperture similar to aperture 16 in actuator 14, but the guide generally is part of a continuous molded plate that includes a guide for each of the key switches in a keyboard array. Here, the plunger guide is formed in the actuator 14, which must be isolated from the rest of the keyswitch array to provide for imparting lateral forces for pointing operations. The structure shown in FIG. 2, therefore, is freestanding, except that it is mounted on the base plate or printed circuit board 30.

In normal keyswitch operation, as noted, the pointing device apparatus does not affect the switch operation. The tactile response or "feel" of the keyswitch is the same as an unmodified keyswitch, in that it is determined by the usual dome spring 21 on the rubber dome sheet 20. During a pointing operation, the indexing surfaces 11, 18 contact each other so that all forces imparted to the key cap 10 by an operator are transmitted to the actuator 14 and, through the actuator surfaces 17, to the force-sensing array 22. As noted above the force-sensing elements are pre-loaded to a predetermined operating point, so that a lateral force applied to the key cap 10, for example, along the X or Y axis, results in a differential signal in that the force applied to one of the force-sensing elements 24 is increased while the force applied to the force-sensing element opposite the first force-sensing element is decreased. (A force applied in any direction off the X or Y axis results in resistance to change in all four sensing elements.)

The keycap and plunger are supported, in the depressed state, by the actuator 14. Accordingly, downward or Z direction forces are coupled through the actuator surfaces 17 to the sensing array 22. The present apparatus thereby measures the overall or net force applied by an operator. The net force can easily be computed by summing the forces on all the sensors. The net applied force information is useful in many applications, for example, to control cursor speed, or to provide Z axis control. Increasing the apparent cursor speed in response to a greater operator applied force provides a natural and ergonomically efficient response.

The pre-load pad 34 also affords the advantage of neutralizing manufacturing variations in the various components described, as well as obviating a pivot's high tolerance requirements. In use, the compressed pre-load pad 34 takes up variations in thickness of the elements in between the backup plate 36 and the actuator 14 to avoid any play or wobble in the system. As long as the force-sensing elements are biased to some reasonable operating point, a processing unit coupled to the force-sensing array can be arranged to calibrate itself to define zero force as whatever resistances are provided by the force-sensing elements in the absence of externally applied forces.

FIG. 3 is an exploded view of a multi-purpose keyswitch similar to the apparatus of FIGS. 1 and 2, with like reference numbers shown for common elements. The apparatus of FIG. 3, however, includes an X-shaped spring 40 disposed beneath the base plate 30 and held in place by a retainer assembly 42. The retainer assembly 42 includes fastening means that extend through apertures in the spring 40, base plate 30, elastomer 20, force sensor array 22, etc. and are fixed to the actuator 14 for holding the assembly together. The preload pad 34 of FIGS. 1 and 2 is omitted, as the preloading is provided by spring assembly 40. The spring assembly is formed of metal, and this arrangement is found to be superior in some respects to the foam pad preload arrangement described above, as the metal spring is more resilient over time. Other arrangements may be used for driving force sensors to provide a base line response. Note that while force-sensitive resistors generally require some preloading force to obtain a useful baseline response, other types of sensors may exhibit a useful baseline response at rest.

Circuitry for Reading Force Sensors

Turning now to FIG. 3, indicated generally at 100 is a circuit constructed in accordance with the present invention for sampling the values of a plurality of force sensitive resistors. Included therein are force sensitive resistors 102, 104, 106, 108. These may correspond, for example, to the sensor elements 24 in the sensor array 22 depicted in FIGS. 1–3. Each of FSRs 102–108 exhibits an individual resistance between about 4 k-ohms to 80 k-ohms, dependent upon the force applied to each sensor, and depending upon each sensor's specific characteristic response or transfer function. The maximum resistance is limited by preloading. The minimum resistance is discussed further below. The FSRs are connected to a common line 110 which in turn is connected to a node 112 via a 100 ohm resistor 114. The node is an output of a +5 volt DC power supply (not shown). Capacitors 116, 118, having values of 0.1 and 22 microfarad, respectively, are connected between line 110 and ground.

A comparator 120 includes a reference terminal 122 and an input terminal 124. Comparator 120 operates in the usual fashion in that a signal having a predetermined level is applied to terminal 122. When a signal applied to terminal 124 exceeds the signal level applied to terminal 122, an output terminal 126 of the comparator rises to a high level. Terminal 122 is connected to a juncture between resistors 128, 130 which supplies voltage at a predetermined level determined by the value of the resistors.

A multiplexor (MUX) 132 in the present embodiment of the invention comprises an MC 74HC4052 manufactured by Motorola. The multiplexor includes what is referred to herein as a second set of input terminals X0, X1, X2, X3, indicated generally at 134. A first set of input terminals is indicated generally at 136 and includes terminals Y0, Y1, Y2, and Y3.

A first MUX output terminal Y is connected to ground via a 200 ohms resistor 140. A second MUX output terminal X is connected via a line as shown to terminal 124 with comparator 120. A pair of control lines 142, 144 supply a control signal from a controller 146 to MUX 132. Mux 132 operators in the usual fashion in that when lines 142, 144 are as illustrated in the following table, the input terminals indicated in the table are connected to output terminals X for charging one of the capacitors 148–154 and to terminal Y for discharging one of the capacitors, as shown. Thus, e.g., when lines 142, 144 are both low, terminal X0 is applied to terminal X and terminal Y0 is applied to terminal Y thus allowing capacitor 148 to charge while simultaneously discharging capacitor 150.

TABLE 1

| MUX OPERATION. | | | |
|---|---|---|---|
| LINE 142 | LINE 144 | CHARGE | DISCHARGE |
| 0 | 0 | Cap 148 | Cap 150 |
| 0 | 1 | Cap 150 | Cap 152 |
| 1 | 1 | Cap 152 | Cap 154 |
| 1 | 0 | Cap 154 | Cap 148 |

In the present embodiment of the invention, controller 146 is an 8051 controller manufactured by Intel Corporation. Controller 146 includes a programmable read-only memory (PROM) as well as a 16-bit hardware counter. In the present embodiment of the invention, however, only 12 bits are used to generate a count. Controller 146 receives an input from output terminal 126 of comparator 120 and provides control signals on lines 142, 144 as indicated in the above table and as more fully described hereinafter.

Finishing now the description of circuit 100, capacitors 148, 150, 152, 154 are each connected between ground and an associated one of FSRs 102–108. A plurality of lines connect the juncture of each FSR and capacitor to one of the input terminals in the second set 134 and to another input terminal in the first set 136.

In operation, code implemented in the PROM in controller 146 sequences signals on lines 142, 144 through the various states indicated in the table above. As can be seen, each time the levels on control lines 142, 144 change to the next state, a different one of the capacitors is discharged through ground via connection to one of input terminals 136. The capacitor which was connected to ground in the preceding state is connected to output terminal X via one of terminals 134 and thus is applied to the input of comparator 120. The program implemented in controller 146 starts the counter referred to above each time there is a state change. Thus, each time there is a state change, a fully discharged capacitor begins charging through its associated FSR. When the charge value reaches the level applied to terminal 122 of comparator 120, the comparator output 126 goes high, thus signalling controller 126 to (a) stop and store the count and (b) shift to the next state illustrated in the table. Thus, by measuring the time it takes each FSR to charge its associated capacitor, different "counts" are generated which are related to the relative values of the resistance of each FSR at the time the count was made.

While the pointing device is in a pointing state, also referred to herein as an operating mode, as determined by the software in controller 146, each of the resistances is sampled as described above every 1/16 second. These readings are activated responses, i.e. those acquired while external forces are applied to the sensors (by a user's finger). The selected power supply resistance and capacitance values in circuit 100 result in typical charging times for each of capacitors 148-154 in the range of 1/2500-1/100 second.

When the device is not in a pointing mode, the resistors are sampled every second. The counts obtained while not in a pointing mode provide the baseline responses for the four sensors. These are the responses when no external force is applied to the sensors. "External forces" here means forces applied by a user, as distinguished from preloading forces. Periodically reading the baseline responses allows the software to update baseline response data, for example by a moving average calculation, to compensate for aging, environmental factors, etc. over time.

FSR Response Characteristics

The present methods require first characterizing the type of sensor in use to determine a general characteristic transfer function. This depends on the construction of the sensors. Force sensitive resistors, for example, may be made in several ways. In one type of FSR, the conductors are interleaved, as described in U.S. Pat. No. 4,314,227 to Eventoff. Another type of force sensitive resistor has an array of discrete conductive regions, as described in commonly-assigned application Ser. No. 07/948,143, entitled "Transducer Array". Each different type of FSR has its own type of generally characteristic force-to-resistance transfer function.

Figure 5:
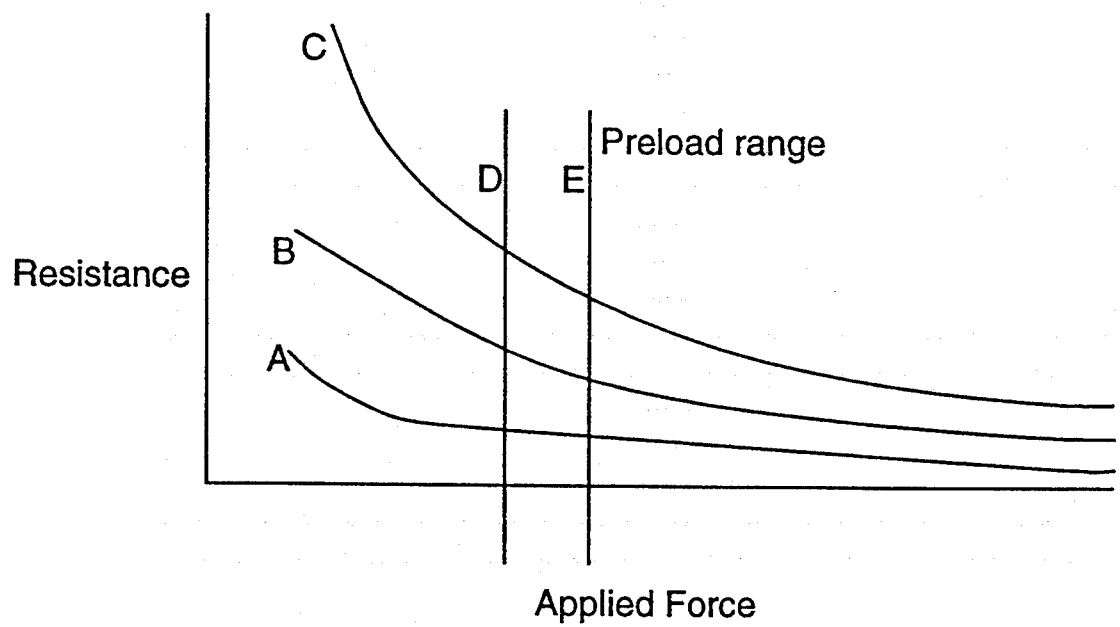
FIG. 5 is a plot illustrating applied force to resistance transfer characteristics for an interleaved-conductor type of force sensitive resistors (FSRs).
Figure 6:
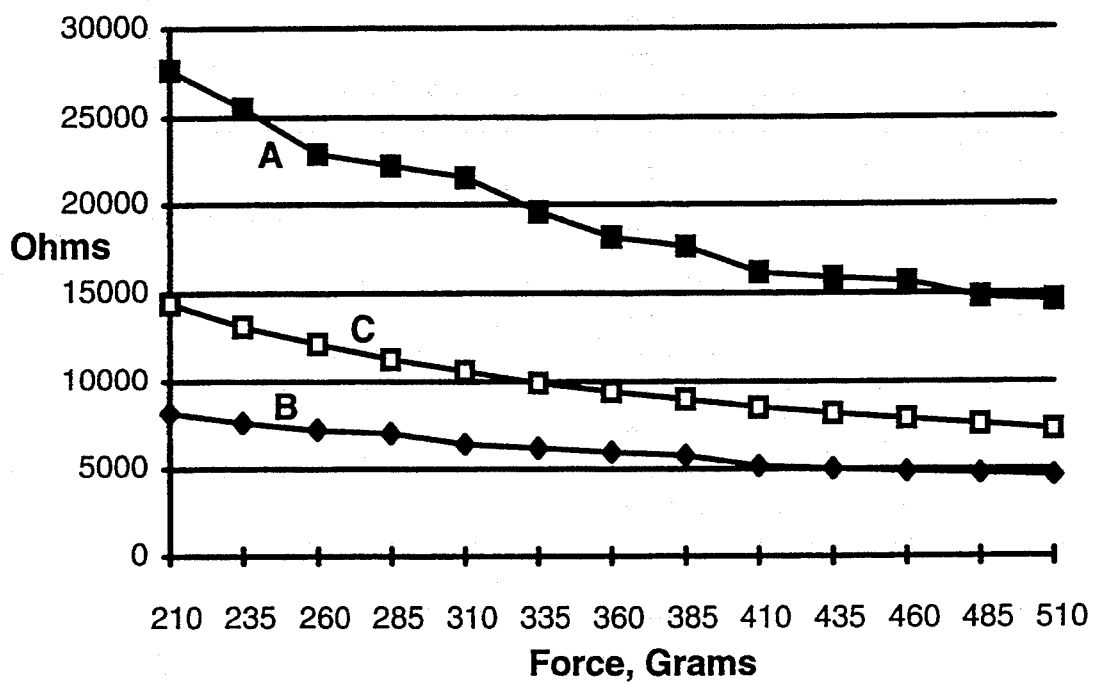
FIG. 6 is a plot illustrating ranges of resistance curves for FSRs.

The interleaved-conductor FSRs exhibit transfer characteristics generally as illustrated in FIG. 5. FIG. 5 is a plot showing the results of measuring several hundred FSRs of this type. Curve A shows the minimum sensitivity or change in resistance versus applied force among the population sampled. Curve C shows the greatest sensitivity among the sensors sampled. Curve B represents an average of the various responses among those sensors sampled. Thus it can be seen that there is a wide variation in transfer curves among these sensors. Moreover, the transfer curves vary somewhat in shape, i.e., they are not parallel. On the other hand, all of the sensors exhibit the same general shape of transfer curve, which may be described as a 1/x type of curve, at least in a central region of operation. The first step toward normalizing sensor responses is to characterize a population of sensors in this way. FIG. 6 is a plot of measured resistances versus applied force in the neighborhood of 360 grams for a population of FSRs. Curve A is the maximum response measured; curve B is the minimum; and, curve C is the average.

Referring again to FIG. 5, vertical lines D and E delineate a range of preload forces. This refers to the force applied to the sensors by a preloading means, such as a preload pad or spring described above. A range of forces is shown because the exact value of the preload force on any particular sensor in use is unknown. It will depend upon the preloading means, other aspects of the mechanical assembly, manufacturing tolerances, and other variables, particularly the transfer characteristic of the device. The variability in sensor transfer curves, as well as variability in the preload forces, leads to a wide variation in measured resistance for a given applied force. Nonetheless, we have found that the baseline response of given sensor, such as an FSR, gives an indication of its transfer characteristics. Specifically, the transfer curve of a particular sensor, lying somewhere between curves A and C as illustrated in FIG. 5, is roughly proportional to the baseline response of that sensor. This allows us to effectively "select" approximately the correct transfer curve by including in our applied force calculations a term proportional to the baseline response. Thus we determine a specific transfer function for the individual sensor by applying the baseline response to the general characteristic transfer function.

The transfer function of an individual FSR sensor also depends on its minimum resistance. We have determined empirically that interleaved-conductor FSRs do not vary widely in their minimum resistance values, i.e., the resistance exhibited by the device in response to a large force. By a large force we mean a force of sufficient magnitude that additional force does not result in a significant further change in resistance. In other words, for the entire sensor population investigated, the transfer curves converge essentially to horizontal at the minimum resistance level. This minimum resistance level is approximately 4 K-ohms for interleaved-conductor FSRs commercially available from Interlink, Inc. of California. The value of course depends on the particular type of devices of interest.

A useful or nominal minimum resistance value may be determined by measuring response values of each of a statistically significant number of sensors, under an applied force adequate to drive each sensor to exhibit approximately its minimum response value, and then combining the measured minimum response values to from the nominal minimum response value. The values may be combined, for example, by averaging, but we prefer to use the lowest actual value measured for calculating applied forces.

Based on the observations described above, we have found that a change in force (delta F), i.e. the change relative to the baseline response resulting from an external force, can be well approximated by the following relationship:

$$\Delta F \text{ counts} = [(R_{baseline} - \min R)/(R_{activated} - \min R)] * K - J.$$

Where $R_{baseline}$ is the baseline value, i.e., the preloaded response in the case of a preloaded FSR; minR is the nominal minimum resistance value described above; K is a scaling factor which depends upon the particular application and on the sampling method used; and J is a numerical offset. The ratio $[(R_{baseline} - \min R)/(R_{activated} - \min R)]$ is the specific transfer function for the individual sensor in this example.

Finally, we apply the specific transfer function to the activated response value to determine an indication of the magnitude of the applied external stimulus, thereby correcting in use for variations in sensitivity among sensors of the specific type in use. In the preferred embodiment, the keyboard controller software described above includes code for executing this calculation using the resistance data it acquires.

In one operative example, an array of interleaved-conductor FSRs are used for force sensing. The nominal minimum resistance value minR is 4 K-ohms. A range of 0 to 106 force "counts" is selected as convenient for providing applied force data for cursor control. In the example, this range is achieved by selecting 128 as the scaling factor K (128 also being convenient for binary arithmetic). As discussed above, individual sensors may be "loaded" or "unloaded" by an applied force. The offset J is used to shift the force numbers so as to avoid negative numbers. In the example, a shift of 90 is used. The offset is selected so as to allow greater range of forces above the baseline response than below it. Our target range is about 100 grams of unload and 300–400 grams of additional applied force.

Referring now to the spreadsheet of FIG. 7, operation of the operative example is shown. Here, each of four sensors have very different specific response characteristics. Referring to the row "Baseline Value," those values are 10 (K-ohms), 6, 18 and 26. These are the respective resistances exhibited by the sensors absent external forces (under preload). Next, seven "readings" are listed for each sensor, labeled "Active Res2" through "Active Res8". The name is short for activated resistance value, referring to values acquired while external force is applied (e.g. while pointing). For each sensor, a number of force counts is calculated by the spreadsheet for each activated resistance reading, using the formula and constant values set forth above.

Figure 8:
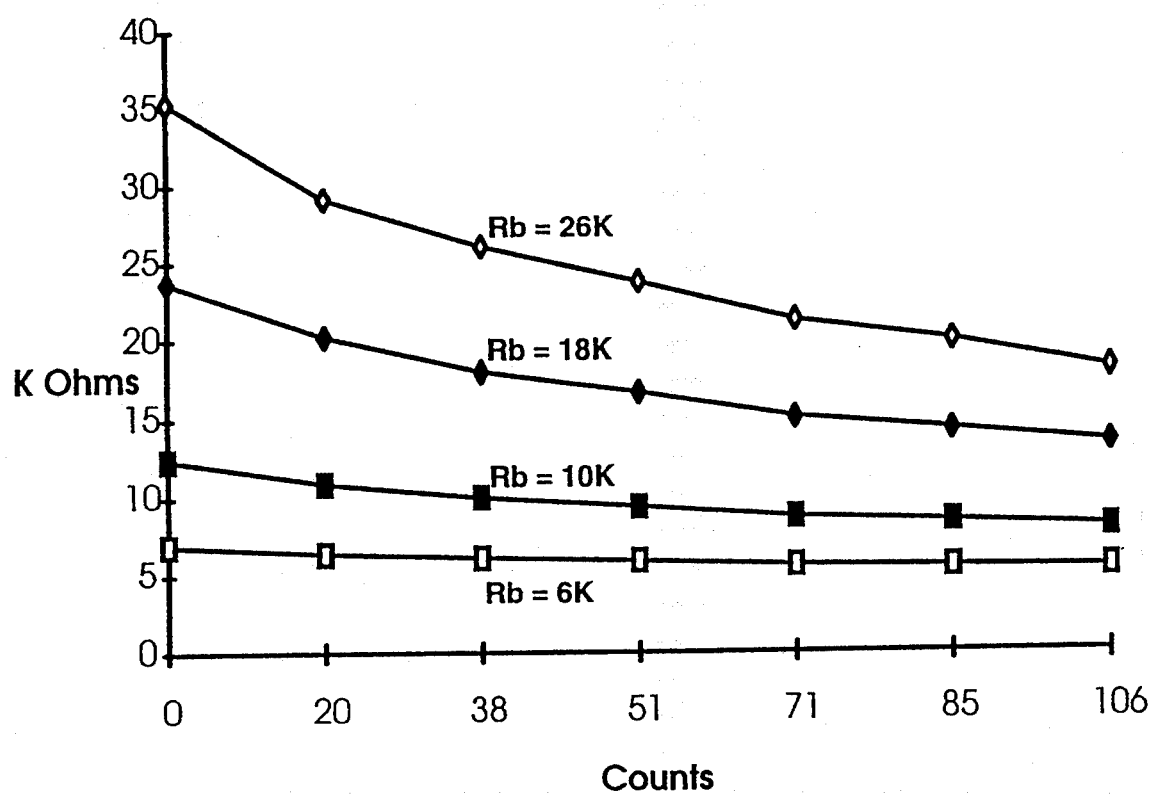
FIG. 8 is a plot illustrating change in resistance versus A/D counts in a force sensing system for various baseline responses.

The bottom row in FIG. 7 indicates the "gain" or "sensitivity" of each sensor, expressed as the change in measured resistance "deltaR" per count (over the 0 to 106 range). It may be observed that the sensitivities of these four sensors vary from 14.2 to 162.3 or over 90 percent. Yet the effect of the calculation is to essentially normalize the responses to a range of approximately 0 to 106, with the baseline response equal to 38. The baseline response is normalized to 38 to allow greater range of increased force than reduced (unload) force. The result is a very useful pointing system (which could be a joystick by ignoring the integrated keyswitch in the example), which exhibits smooth, linear responses independent of direction of applied force. FIG. 8 is a plot of the data reflected in the spreadsheet of FIG. 7.

Arrayed Transducer Example

Another type of force transducer, as noted above, is an arrayed transducer, i.e., one having an array of individual, discrete conductive regions. We have found that arrayed transducers exhibit a general characteristic transfer function that is approximately linear versus applied force. Moreover, a higher initial resistance in an individual sensor, i.e. a resistance reading at rest, correlates with a steeper falloff or slope in the specific response curve. This relationship is determined by characterizing a statistically significant population of the sensors, as in the case of interleaved FSRs. The characteristic slope or "gain" can vary widely from one sensor to another. But, the general shape of the curve is consistent (linear), so we can use the baseline response (here the resting resistance) for normalizing the various responses. Thus, a baseline response (here the initial resistance at rest) of an arrayed transducer gives an indication of the corresponding individual device's sensitivity, and can be applied to the general (linear) transfer characteristic to determine the specific transfer function.

For arrayed transducers a useful force count therefore can be calculated as follows:

$$\text{force count } \Delta F = (R_{activated} - R_{initial}) \times K$$

where K is a scaling factor proportional to the initial resistance. This method of computing a magnitude of the external applied stimulus has the advantage, as in the FSR example, of normalizing applied force sensor data, thereby correcting for variations in sensitivity among sensors of the specific type in use.

In general, the method of the present invention requires first characterizing the sensor type of interest to determine a general transfer characteristic. This may take the form of known relationships, or be done empirically. Next, we acquire a baseline response from each sensor to get an indication of the transfer characteristics of each individual device. The baseline response may be determined under some "preloaded" condition, as in the multipurpose keyswitch assembly described above, or the baseline response may simply be an "at rest" condition, as in the arrayed transducer example. Next we determine a specific transfer function for each individual sensor by applying the corresponding baseline response to the general characteristic transfer function; and finally, apply the specific transfer function to the activated response values to determine an indication of the magnitude of the applied external stimulus, thereby correcting in use for variations in sensitivity among sensors of the specific type. Determining and applying the specific transfer function is accomplished in a single calculation using the formulae shown above. While other types of sensors will exhibit different general transfer characteristics, in most cases a baseline response can be identified for determining, at least approximately, a specific transfer function for each individual sensor. These methods are especially useful for making inexpensive sensors useful in many applications, such as pointing operations, where Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of acquiring data from a individual electronic sensor of a specific type during external stimulus of the individual sensor to correct in-use for variations in sensitivity among sensors of the specific type, the method comprising:

providing a general characteristic transfer function indicative of the sensors of a specific type:

reading a baseline response of the specific sensor in an absence of external stimulus that is indicative of its transfer characteristics;

while an external stimulus is applied to the sensor, reading an activated response value exhibited by the sensor;

determining a specific transfer function for the individual sensor by applying the baseline response to the general characteristic transfer function; and applying the specific transfer function to the activated response value to determine an indication of the magnitude of the applied external stimulus, thereby correcting in-use for variations in sensitivity among sensors of the specific type.

2. A method according to claim 1 wherein:
the specific type of sensor is an interleaved FSR;
the general characteristic transfer function is a 1/X curve that asymptotically approaches a predetermined minimum resistance value;
the baseline response is a preloaded resistance value; and
the activated response is a resistance reading acquired while an external force is applied to the FSR; and
said determining the specific transfer function and applying the specific transfer function includes computing a ratio of the baseline response less the minimum resistance, divided by the activated response less the minimum resistance.

3. A method according to claim 1 wherein:
the specific type of sensor is an arrayed transducer;
the baseline response is a resistance reading acquired from the transducer at rest;
the general characteristic transfer function is a linear force-to-resistance curve having a value proportional to the baseline response;
the activated response is a resistance reading acquired while an external force is applied to the arrayed transducer; and
said determining the specific transfer function and applying the specific transfer function includes computing a product of the activated response less the baseline response, and a scaling factor proportional to the baseline response.

4. A method according to claim 1 wherein:
the electronic sensor is a force sensor;
determining a baseline response includes reading a response exhibited by the sensor when no external force is applied to the sensor; and
the external stimulus is an external force applied to the sensor.

5. A method according to claim 4 further comprising:
providing a predetermined nominal minimum response value for the sensor; and wherein the specific transfer function of the sensor is determined based on the nominal minimum response value and the baseline response of the sensor.

6. A method according to claim 5 wherein:
the force sensor is an FSR type of sensor having a general characteristic transfer function that is a generally inverse function of applied force;
the baseline response is a resistance reading taken while the sensor is preloaded and in the absence of an external force; and
said computing step includes determining a quantity proportional to the external force applied to the sensor as a ratio of the baseline response less the minimum response, divided by the measured response less the minimum response.

7. A method according to claim 5 wherein the computing step includes normalizing the sensitivity of the sensor responsive to the baseline reading so that a predetermined change of one force "count" approximately corresponds to a predetermined change in applied force.

8. A method according to claim 5 wherein reading the FSR includes:
converting the activated FSR resistance to an analog voltage; and
converting the analog voltage to a digital count for computing an indication of the applied force.

9. A method according to claim 5 wherein determining a baseline resistance includes:
determining whether or not an external force is applied to the FSR; and
while no external force is applied to the FSR, reading the FSR to acquire the baseline resistance reading.

10. A method according to claim 5 wherein providing the minimum response value includes measuring response values of each of a statistically significant number of sensors under an applied force adequate to drive each sensor to exhibit approximately its minimum response value, and then combining the measured minimum response values to form the nominal minimum response value.

11. A method according to claim 10 wherein said combining step includes computing an average of the measured minimum response values.

12. A method according to claim 10 wherein said combining step includes selecting a smallest of the measured minimum response values as the nominal minimum response value.

13. A method according to claim 10 wherein the sensor transfer characteristic is a generally inverse relationship between applied force and response; and
said computing the quantity proportional to the external force applied to the sensor is determined by a ratio of the baseline response less the minimum response, divided by the measured response less the minimum response.

* * * * *